United States Patent [19]

Hoshihara et al.

[11] Patent Number: 5,641,146

[45] Date of Patent: Jun. 24, 1997

[54] SEAT SLIDING APPARATUS FOR A VEHICLE

[75] Inventors: Naoaki Hoshihara, Nagoya; Yukifumi Yamada, Toyota, both of Japan

[73] Assignee: Aisin Seiki Kabushiki Kaisha, Kariya, Japan

[21] Appl. No.: 309,481

[22] Filed: Sep. 21, 1994

[30] Foreign Application Priority Data

Sep. 22, 1993 [JP] Japan .................. 5-236647

[51] Int. Cl.$^6$ .................................................. F16M 13/00
[52] U.S. Cl. .................. 248/430; 248/424; 297/344.11
[58] Field of Search ................................ 248/430, 424, 248/429, 420, 393; 297/311, 344.1, 344.11

[56] References Cited

U.S. PATENT DOCUMENTS

| | | | |
|---|---|---|---|
| 3,552,795 | 1/1971 | Perkins et al. | 248/430 |
| 4,624,498 | 11/1986 | Nagashima et al. | 248/430 |
| 4,725,032 | 2/1988 | Kazaoka et al. | 248/420 |
| 4,811,925 | 3/1989 | Fujita et al. | 248/430 |
| 4,863,289 | 9/1989 | Lecerf | 248/430 |
| 4,901,421 | 2/1990 | Takarabe et al. | 248/430 |
| 5,076,530 | 12/1991 | Dove et al. | 248/420 |
| 5,137,244 | 8/1992 | Negi | 248/430 |
| 5,192,045 | 3/1993 | Yamada et al. | 248/430 |

FOREIGN PATENT DOCUMENTS

| | | | |
|---|---|---|---|
| 209615 | 1/1987 | European Pat. Off. | 248/430 |
| 70 29 124 | 11/1971 | Germany . | |
| 116945 | 5/1988 | Japan | 248/430 |
| 3-84237 | 8/1991 | Japan . | |
| 4-79732 | 7/1992 | Japan . | |

*Primary Examiner*—Leslie A. Braun
*Assistant Examiner*—Anita M. King
*Attorney, Agent, or Firm*—Burns, Doane, Swecker & Mathis, LLP

[57] ABSTRACT

A seat sliding apparatus for a vehicle includes a pair of lower rails for being fixed on a floor of the vehicle, a pair of upper rails for being fixed to a seat cushion each of slidably engaged with the corresponding lower rail, a pair of front rollers each of rotatably supported on a front portion of the lower rail so as to support the upper rail and a pair of rear rollers each of rotatably disposed between the upper rail and the lower rail.

12 Claims, 5 Drawing Sheets

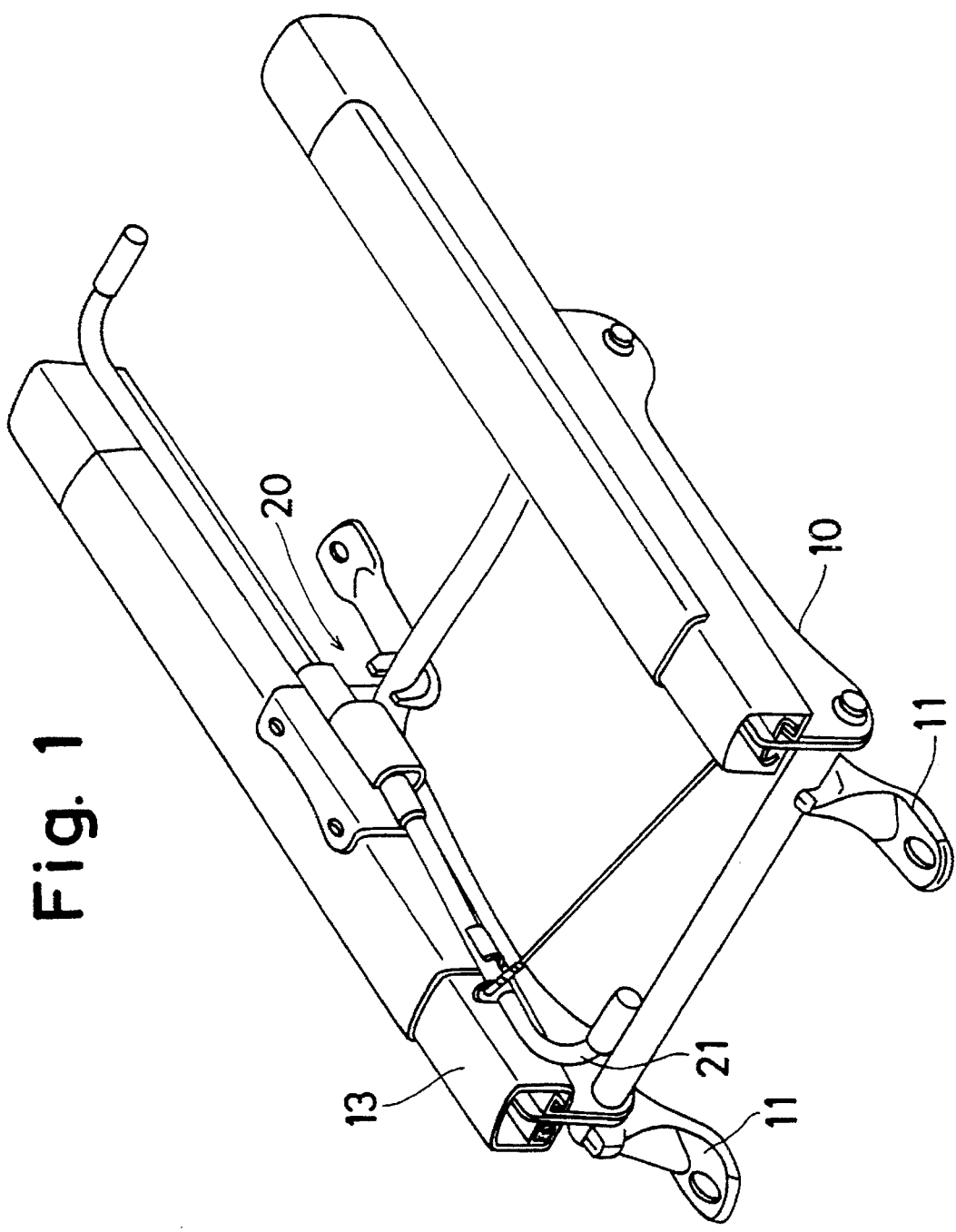

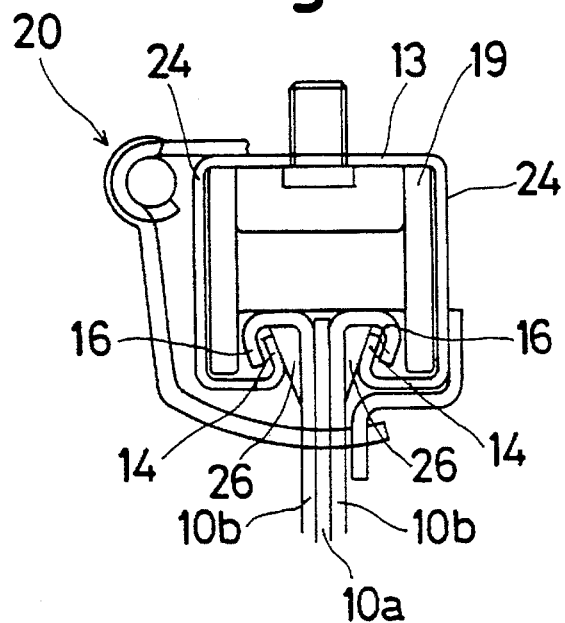
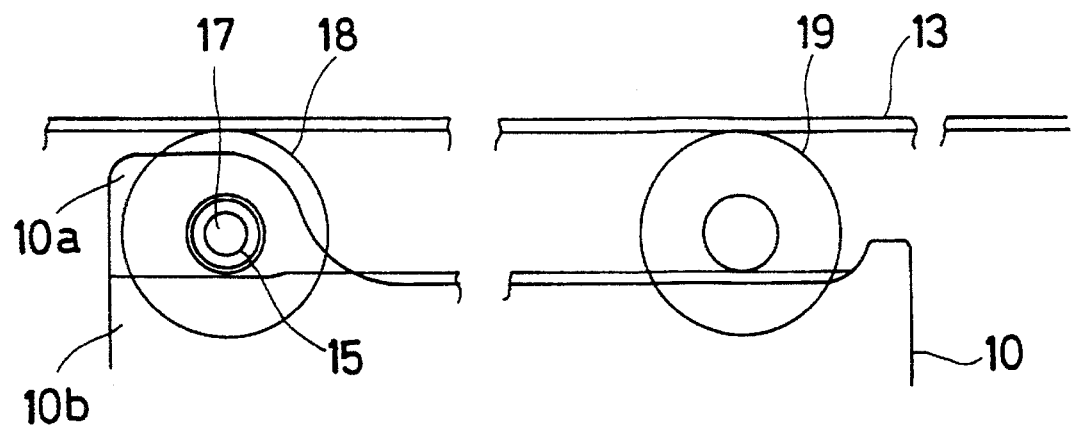

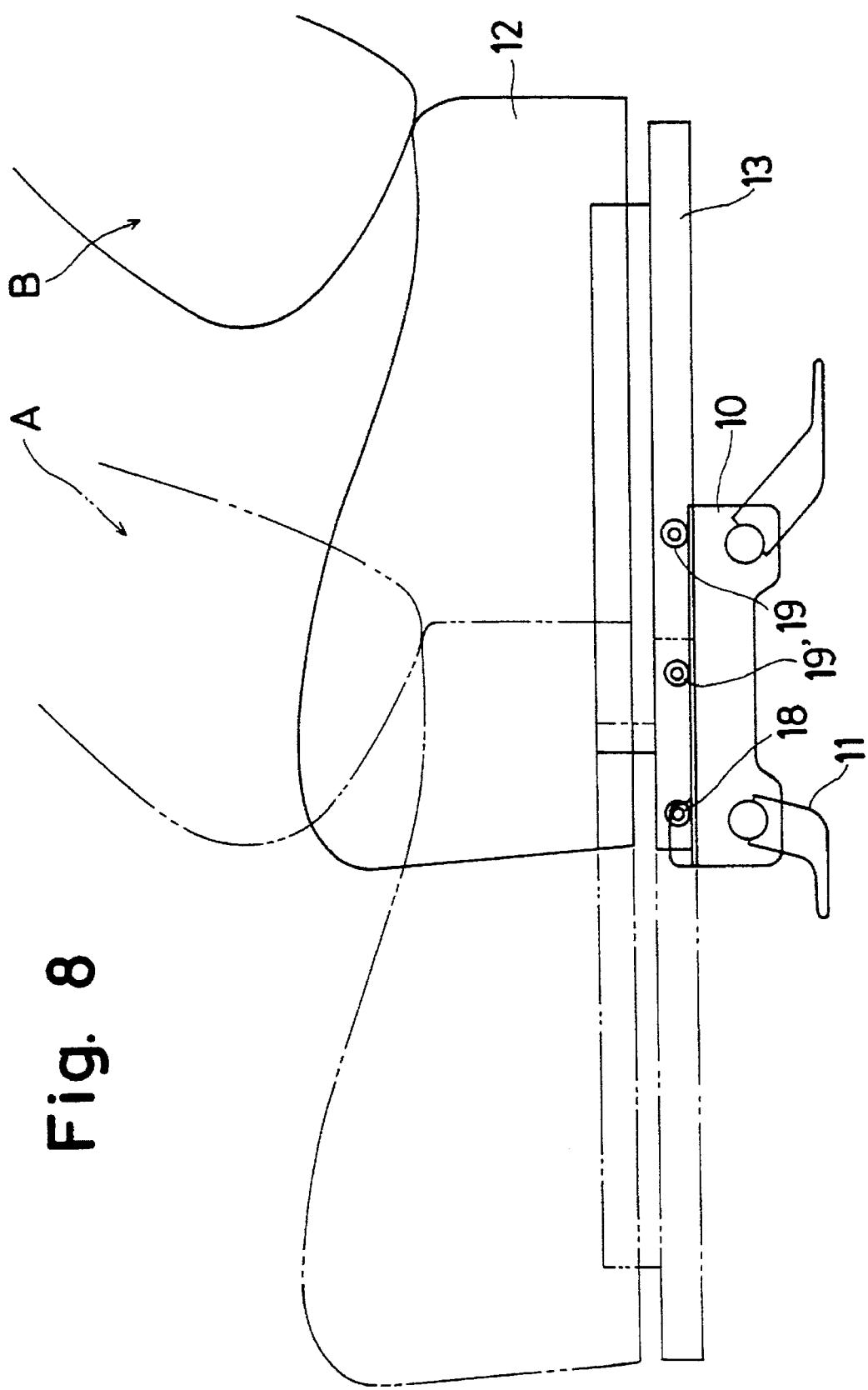

SEAT SLIDING APPARATUS FOR A VEHICLE

BACKGROUND OF THE INVENTION

1. Field of the Invention

This invention relates to a seat sliding apparatus for a vehicle. Move particularly the present invention pertains to a vehicle seat sliding apparatus for moving the seat of the vehicle forward and backward by the driving power of an electric motor or through operation by a passenger.

2. Description of the Related Art

A conventional seat sliding apparatus for a vehicle is disclosed in Japanese Utility Model publication No. 4 (1992)-79732. The seat sliding apparatus disclosed in this document comprises a pair of upper rails fixed to the seat cushion of the vehicle, a pair of lower rails fixed to the vehicle floor and a pair of rollers which are each rotatably supported on a front portion and a rear portion of each of the upper rails.

Another conventional seat sliding apparatus for a vehicle is disclosed in Japanese Utility Model publication No. 3 (1991)-84237. The seat sliding apparatus disclosed in this document comprises a pair of lower rails fixed on a vehicle floor, a pair of upper rails fixed to a seat cushion and an intermediate rail disposed between one of the upper rails and the corresponding lower rail. The upper rails of the seat sliding apparatus are slid in two stages so as to be moved with a long stroke when a passenger rides in the vehicle.

In the seat sliding apparatus disclosed in the first document mentioned above, it is not possible to increase the moving stroke of the upper rails when a passenger is riding in the vehicle without making the upper rails longer. The upper rails cannot be made longer because of the standard scale of a vehicle cabin. On the other hand, the seat sliding apparatus disclosed in the latter document mentioned above is apt to be complicated.

SUMMARY OF THE PRESENT INVENTION

It is an object of the present invention to provide a seat sliding apparatus for a vehicle which can increase the sliding stroke of the upper rails without making the upper rails longer.

It is another object of the present invention to provide a seat sliding apparatus for a vehicle which is simple in construction and small in size.

It is a further object of the present invention to provide a seat sliding apparatus for a vehicle which is low in cost.

It is a further object of the present invention to provide a seat sliding apparatus for a vehicle which can be conveniently manufactured.

It is a further object of the present invention to provide a seat sliding apparatus for a vehicle which is durable.

To achieve the above mentioned objects, a seat sliding apparatus for a vehicle in accordance with this invention comprises a pair of lower rails for being fixed on a floor of the vehicle, a pair of upper rails for being fixed to a seat cushion and for being slidably engaged with the corresponding lower rail, a pair of front rollers each of which is rotatably supported on a front portion of the lower rail so as to support the upper rail, and a pair of rear rollers each of which is rotatably disposed between the upper rail and the lower rail.

BRIEF DESCRIPTION OF THE DRAWINGS FIGURES

The features and advantages of the seat sliding apparatus for a vehicle according to the present invention will be more clearly appreciated from the following description considered in conjunction with the accompanying drawing figures in which like elements are designated with like reference numerals and wherein:

FIG. 1 is a perspective view of a first embodiment of a seat sliding apparatus for a vehicle of the present invention;

FIG. 2 is a sectional view of a rear portion of the seat sliding apparatus for a vehicle shown in FIG. 1;

FIG. 3 is a side view of the seat sliding apparatus for a vehicle shown in FIG. 1;

FIG. 8 is a side view of the seat sliding apparatus for a vehicle shown in FIG. 1 explaining the sliding operation of the seat cushion.

DETAILED DESCRIPTION OF PREFERRED EMBODIMENTS OF THE INVENTION

Figure 4:
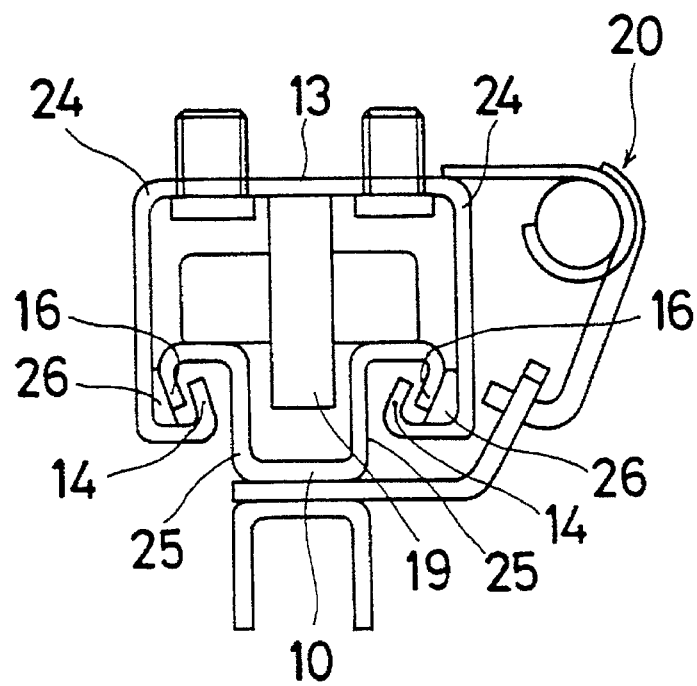
FIG. 4 is a sectional view of a rear portion of a second embodiment of a seat sliding apparatus for a vehicle of the present invention.

A seat sliding apparatus for a vehicle in accordance with the present invention is illustrated in the FIG. 1. The seat sliding apparatus for a vehicle comprises a pair of lower rails 10 each of which is mounted on a floor of a vehicle through brackets 11. The seat sliding apparatus for a vehicle also comprises a pair of upper rails 13 each of which is fixed to a seat cushion 12 of a front seat.

A sectional view of a rear portion of the seat sliding apparatus for a vehicle is shown in the FIG. 2. As shown in the FIG. 2, each of the upper rails 13 includes a pair of connected side walls 24 which are disposed opposite each other so as to form an inverted U-shaped configuration as seen in section. The upper rail 13 further includes a pair of engaging portions 14 at the free end portions thereof.

Each of the lower rails 10 is formed with three frames 10a, 10b, 10b. The frame 10a (a middle frame) is disposed between the frames 10b, 10b (the outer frames) and extends in the upper direction. The frame 10a includes a through opening 15 as shown in FIG. 3. Each of the frames 10b is also formed into an inverted U-shaped or J-shaped configuration in section so as to have an engaging portion 16 formed at a free end portion thereof which extends outward.

Each of the upper rails 13 is engaged with the corresponding lower rail 10 by engagement between the engaging portions 14, 16 so that the upper rail 13 covers the lower rail 10. A pair of shoes 26 are disposed between the engaging portions 14, 16.

As shown in the FIG. 3, a shaft 17 is inserted through the through opening 15. Therefore a front roller 18 is rotatably supported on the lower rail 10. A rear roller 19 is disposed between the upper rail 13 and the lower rail 10 so as to be able to roll on the lower rail 10. One of the upper rails 13 includes a rock mechanism 20 having an operation lever 21. The operation lever 21 is designed to be operated from the front and rear portions of the vehicle seat.

The rear roller 19 includes a large diameter portion and a small diameter portion. The small diameter portion of the rear roller 19 rolls on the lower rail 10. Further the rear roller 19 supports the upper rail 13 through the large diameter portion. Therefore, the moving stroke of the upper rail 13 relative to the lower rail 10 is larger than that of the rear roller 19 relative to the lower rail 10.

When the seat cushion 12 is moved in the front direction, the operation lever 21 is operated so as to release the rock condition of the seat cushion 12. The front rollers 18 rotate so as not to move relative to the lower rails 10 because the front rollers 18 are supported or mounted on the lower rails 10. However, the rear rollers 19 roll in the front direction with the upper rails 13 because the rear rollers 19 are not supported or mounted on the lower rails 10. Therefore, the moving stroke of the upper rails 13 can be increased without making the upper rails 13 longer.

Further, the moving stroke of the upper rails 13 can be increased without significantly decreasing the spans between each of the front rollers 18 and the rear rollers 19 because the moving stroke of the upper rails 13 relative to the lower rail 10 is larger than that of the rear roller 19 relative to the lower rail 10. Therefore, the rollers 18, 19 are prevented from being worn. The ratio of the moving stroke of the upper rails 13 to that of the rear rollers 19 can be suitably arranged by modifying the large diameter portion and the small diameter portion of the rear rollers 19.

A second embodiment of a seat sliding apparatus for a vehicle of the present invention will be described hereinafter. A sectional view of a rear portion of the seat sliding apparatus for a vehicle is shown in FIG. 4. As shown in FIG. 4, each of the upper rails 13 includes a pair of connected side walls 24 which are positioned opposite each other to form an inverted U-shaped configuration in section. The upper rail 13 further includes a pair of engaging portions 14 at the free end portions thereof.

Each of the lower rails 10 includes a pair of connected side walls 25 which are disposed opposite to each other to also form an inverted U-shaped configuration in section. The lower rail 10 has a pair of outwardly extending engaging portions 16 which are disposed at the free ends thereof. Each of the upper rails 13 is engaged with the corresponding lower rail 10 by engagement between the engaging portions 14, 16 so that the upper rail 13 covers the lower rail 10. A pair of shoes 26 are disposed between the engaging portions 14, 16.

As shown in FIG. 4, a rear roller 19 includes a pair of small diameter portions and a large diameter portion disposed between the small diameter portions. The rear roller 19 is disposed between the upper rail 13 and the lower rail 10 so as to be able to roll on the lower rail 10 through the small diameter portions. Further the rear roller 19 supports the upper rail 13 through the large diameter portion. Therefore, the moving stroke of the upper rail 13 relative to the lower rail 10 is larger than that of the rear roller 19 relative to the lower rail 10. The lower rail 10 is recessed in a central region to provide a concave or U-shaped portion so that the lower rail 10 does not interfere with the large diameter portion of the rear roller 19.

Figure 5:
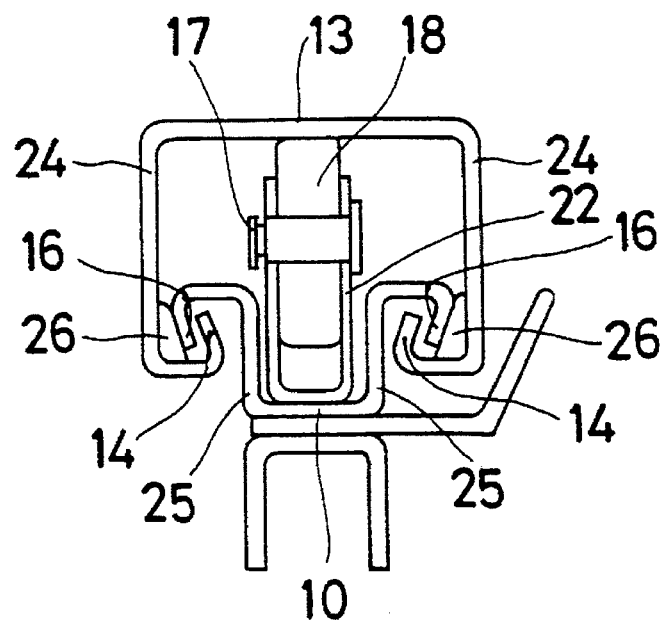
FIG. 5 is a sectional view of a front portion of the second embodiment of a seat sliding apparatus for a vehicle.

As shown in FIG. 5, a shaft 17 is rotatably mounted on a supporting member 22 which is fixed on the lower rail 10 so as to rotatably support a front roller 18 on the lower rail 10. The front roller 18 supports the upper rail 13 on the lower rail 10. One of the upper rails 13 also includes a rock mechanism 20.

Figure 6:
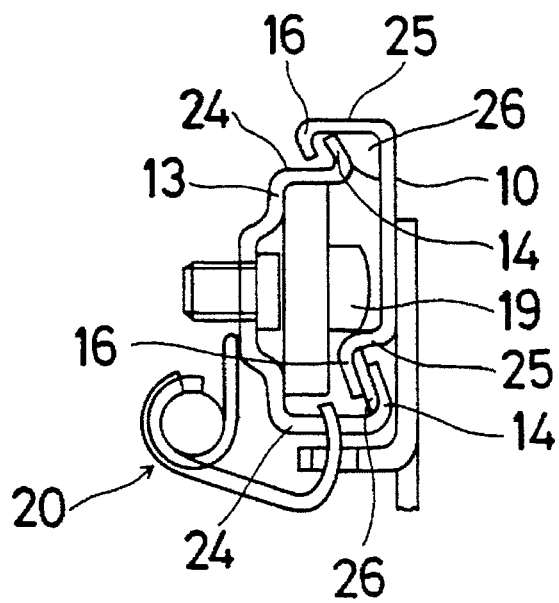
FIG. 6 is a sectional view of a rear portion of a third embodiment of a seat sliding apparatus for a vehicle of the present invention.

A third embodiment of the seat sliding apparatus for a vehicle of the present invention will be described hereinafter. The configuration of rails of this third embodiment is modified so that the embodiment differs from the foregoing embodiments. A sectional view of a rear portion of the seat sliding apparatus for a vehicle is shown in FIG. 6. A sectional view of a front portion of the seat sliding apparatus for a vehicle is shown in FIG. 7.

As shown in FIG. 6, an upper rail 13 includes a pair of connected walls 24 which are disposed opposite to each other to form a C-shaped configuration in section. Each of the walls 24 has an engaging portion 14 at the free end thereof which extends in the upward direction. A lower rail 10 includes a pair of connected walls 25 disposed opposite to each other to form an inverted C-shaped configuration in section. Each of the walls 25 has an engaging portion 16 at the free end thereof which extends in the downward direction. Each of the upper rails 13 is engaged with the corresponding lower rail 10 through the engagement between the engaging portions 14, 16. A pair of shoes 26 are disposed between the engaging portions 14, 16.

A rear roller 19 is disposed between one of the walls 24 of the upper rail 13 and one of the walls 25 of the lower rail 10 so as to be able to roll on the lower rail 10.

Figure 7:
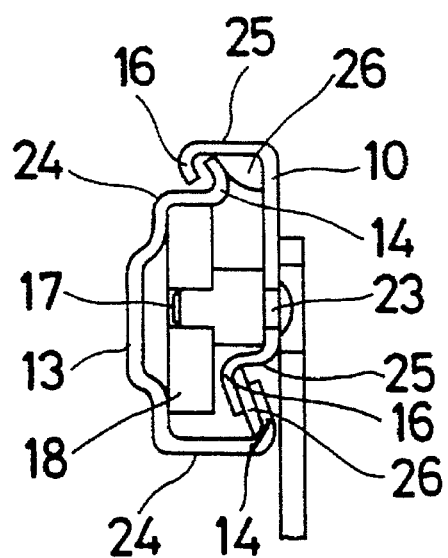
FIG. 7 is a sectional view of a front portion of the third embodiment of a seat sliding apparatus for a vehicle.

As shown in FIG. 7, a shaft 17 is inserted through a through opening 23 disposed in the lower rail 10 to rotatably mount a front roller 18 on the lower rail 10. One of the upper rails 13 includes a rock mechanism 20.

The operation of the seat sliding apparatus is generally illustrated in FIG. 8 in which the seat cushion 12 moved in the front or forward direction is indicted by the arrow A in FIG. 8 when a passenger sits in the rear seat of the vehicle. The seat cushion 12 on which the passenger sits is indicated as an arrow B in FIG. 8. Numeral 19' indicates the rear roller 19 location when the seat cushion 12 is positioned at the forward location indicated with the arrow A.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat sliding apparatus for a vehicle, comprising:
   a pair of lower rails for being fixed on a floor of the vehicle;
   a pair of upper rails for being fixed to a seat cushion, each of the upper rails being slidably engaged with a respective one of the lower rails;
   a pair of front rollers, each of the front rollers being rotatably supported on a front portion of a respective one of the lower rails to support the respective upper rail, each of the front rollers being fixed with respect to the respective lower rail so that each front roller is immovable along a longitudinal extent of the respective lower rail; and
   a pair of rear rollers, each of the rear rollers being rotatably disposed between one of the upper rails and the respective lower rail so as to be movable relative to the longitudinal extent of the respective lower rail and the longitudinal extent of the respective upper rail.

2. A seat sliding apparatus for a vehicle as recited in claim 1, wherein each of the rear rollers includes a large diameter portion supporting the upper rail and a small diameter portion rolling on the lower rail.

3. A seat sliding apparatus for a vehicle as recited in claim 1, wherein each of said lower rails includes a middle frame positioned between two outer frames, and including a shaft extending through a hole in the middle frame of each lower rail, each of said front rollers being mounted on one of said shafts.

4. A seat sliding apparatus for a vehicle as recited in claim 3, wherein each of said upper rails includes two oppositely positioned free ends each provided with an engaging portion, the outer frames of each lower rail including a free end provided with an engaging portion that engages one of the engaging portions of respective upper rail.

5. A seat sliding apparatus for a vehicle as recited in claim 3, including a shoe positioned between the engaging portion of the outer frame and the engaging portion of the respective upper rail.

6. A seat sliding apparatus for a vehicle according to claim 1, wherein each lower rail includes a recessed portion which receives the respective rear roller.

7. A seat sliding apparatus for a vehicle according to claim 6, wherein each upper rail includes two oppositely positioned free ends each provided with an engaging portion, each lower rail including two oppositely positioned free ends each provided with an engaging portion, each engaging portion of the upper rail engaging one of the engaging portions of the respective lower rail.

8. A seat sliding apparatus for a vehicle according to claim 7, including a supporting member fixed to each lower rail, each of the front rollers being supported on a shaft mounted on the supporting member.

9. A seat sliding apparatus for a vehicle, comprising:

a pair of lower rails for being secured on a floor of a vehicle;

a pair of upper rails for being secured to a seat cushion and for moving relative to the lower rails;

a pair of front rollers which are each rotatably supported at a front portion of a respective one of the lower rails to support a respective one of the upper rails, each of the front rollers being fixed with respect to the respective lower rail so that each front roller is immovable along the longitudinal extent of the respective lower rail;

a pair of rear rollers which are each rotatably disposed between one of the lower rails and the respective upper rail so as to be movable relative to the longitudinal extent of the respective lower rail and the longitudinal extent of the respective upper rail; and means for providing a greater movement stroke of each upper rail relative to the respective lower rail as compared to the movement stroke of the rear roller relative to the respective lower rail when the upper rails are moved relative to the lower rails.

10. A seat sliding apparatus for a vehicle according to claim 9, wherein said means includes each of said rear rollers being provided with at least one large portion having an outer diameter that is greater than another portion which has a small diameter portion.

11. A seat sliding apparatus for a vehicle according to claim 10, wherein each upper rail rests on the large diameter portion of the respective rear roller, the small diameter portion of each rear roller resting and being rollable along the respective lower rail.

12. A seat sliding apparatus for a vehicle according to claim 9, wherein each upper rail includes two oppositely positioned free ends each provided with an engaging portion that engages a respective engaging portion provided at free ends of each lower rail.

* * * * *